(12) United States Patent
Dickhaut (10) Patent No.: US 12,063,893 B2
(45) Date of Patent: Aug. 20, 2024

(54) HAY BALE FORK ASSEMBLY (71) Applicant: Aaron Dickhaut, Wadesville, IN (US)

(72) Inventor: Aaron Dickhaut, Wadesville, IN (US)

( * ) Notice: Subject to any disclaimer, the term of this patent is extended or adjusted under 35 U.S.C. 154(b) by 377 days.

(21) Appl. No.: 17/475,779

(22) Filed: Sep. 15, 2021

(65) Prior Publication Data

US 2023/0085188 A1 Mar. 16, 2023

(51) Int. Cl.
*A01D 90/16* (2006.01)
*A01B 63/10* (2006.01)

(52) U.S. Cl.
CPC .............. *A01D 90/16* (2013.01); *A01B 63/10* (2013.01)

(58) Field of Classification Search
CPC ...... A01B 63/10; A01D 90/16; A01D 87/127; A01D 87/122
USPC ................................ 414/24.5, 24.6, 607, 703
See application file for complete search history.

(56) References Cited

U.S. PATENT DOCUMENTS

| | | | | |
|---|---|---|---|---|
| 2,543,496 A | * | 2/1951 | Holopainen | E02F 3/34 414/703 |
| 3,432,184 A | * | 3/1969 | Tweedy | A01B 63/111 280/481 |
| 3,527,308 A | * | 9/1970 | Cheers | A01B 63/10 172/699 |
| 3,734,195 A | * | 5/1973 | Cantral | A01B 63/10 172/7 |
| 4,120,405 A | | 10/1978 | Jones | |
| 4,306,825 A | | 12/1981 | Yilit | |
| 4,318,653 A | | 3/1982 | Benefield | |
| 4,674,786 A | | 6/1987 | Lynch | |
| 5,178,505 A | * | 1/1993 | Smith | B62D 49/02 414/920 |
| 6,223,841 B1 | * | 5/2001 | Susag | E02F 9/0883 180/53.4 |
| 6,830,110 B2 | * | 12/2004 | Schlesser | A01B 63/1006 172/8 |
| 6,921,241 B2 | * | 7/2005 | Rogers | A01G 23/003 414/920 |
| 7,753,636 B2 | | 7/2010 | Hennig | |
| 9,210,843 B1 | * | 12/2015 | Collom | A01D 87/122 |
| 2003/0217852 A1 | * | 11/2003 | Bernhardt | A01B 59/068 172/200 |
| 2012/0187705 A1 | | 7/2012 | Small | |
| 2013/0216345 A1 | | 8/2013 | Townsend | |
| 2013/0236271 A1 | | 9/2013 | Lehmann | |
| 2019/0246547 A1 | * | 8/2019 | Tomich | A01B 59/068 |

* cited by examiner

*Primary Examiner* — Gregory W Adams (57) ABSTRACT

A hay bale fork assembly includes a pair of hydraulic cylinders that is each connected to a rear end of a tractor. A pair of mounting brackets is each pivotally coupled to a respective first lateral side and a second lateral side of the tractor having each of the mounting brackets extending away from the rear end of the tractor. Each of the mounting brackets is pivotally attached to a respective one of the hydraulic cylinders for urging the mounting brackets between a lifted position and a lowered position. A lifting fork is coupled between each of the mounting brackets. The lifting fork has a first tine that is disposed on the lifting fork to penetrate a first hay bale. The lifting fork has a pair of second tines each being disposed on the lifting fork to penetrate a second hay bale.

11 Claims, 5 Drawing Sheets

HAY BALE FORK ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hay bale fork devices and more particularly pertains to a new hay bale fork device for transporting a pair of hay bales on a rear of a skid steer. The device includes a pair of hydraulic cylinders that are attached to a rear end of the skid steer and a pair of mounting brackets that each extend away from the rear end of the skid steer. The device includes a lifting fork that includes a first tine and a pair of second tines. The first tine penetrates a first hay bale and each of the second tines penetrates a second hay bale. In this way the first hay bale and the second hay bale can be simultaneously transported on the skid steer.

(2) Description of Related Art Including Information Disclosed Under 37 CFR 1.97 and 1.98

The prior art relates to hay bale fork devices including a lifting fork that includes a pair of hydraulic cylinders that are each attached to a rear of a tractor and a pair of tines that are each attached to a respective hydraulic cylinder such that each of the tines can be independently lifted or lowered. The prior art discloses a hay bale fork device that includes a single hydraulic cylinder and a single tine attached to the single hydraulic cylinder for lifting a single hay bale. The prior art discloses a variety of three point hitch lifters that includes a plurality of tines for lifting a hay bale. The prior art discloses a variety of hay bale spears that includes a frame which is attachable to a tractor and a plurality of tines extending away from the frame for carrying hay bales.

BRIEF SUMMARY OF THE INVENTION

An embodiment of the disclosure meets the needs presented above by generally comprising a pair of hydraulic cylinders that is each connected to a rear end of a tractor. A pair of mounting brackets is each pivotally coupled to a respective first lateral side and a second lateral side of the tractor having each of the mounting brackets extending away from the rear end of the tractor. Each of the mounting brackets is pivotally attached to a respective one of the hydraulic cylinders for urging the mounting brackets between a lifted position and a lowered position. A lifting fork is coupled between each of the mounting brackets. The lifting fork has a first tine that is disposed on the lifting fork to penetrate a first hay bale. The lifting fork has a pair of second tines each being disposed on the lifting fork to penetrate a second hay bale.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
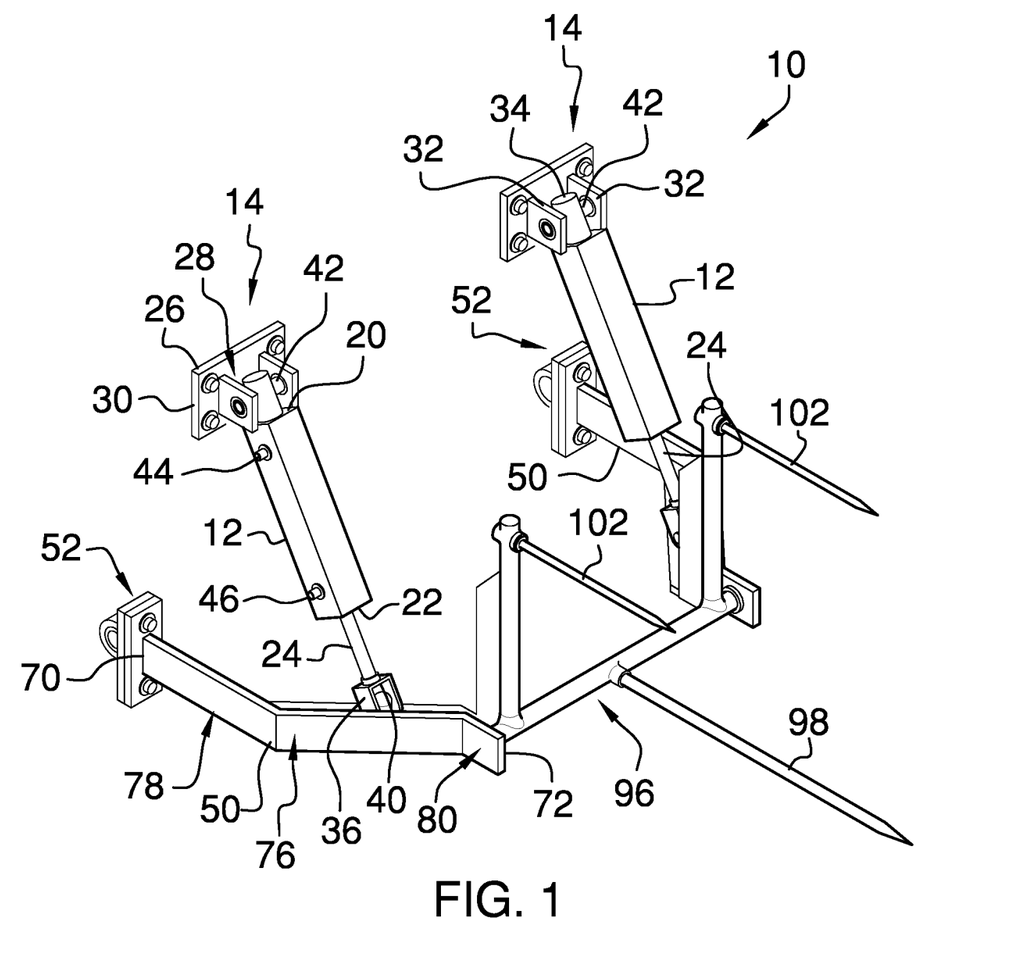
FIG. 1 is a perspective view of a hay bale fork assembly according to an embodiment of the disclosure.
Figure 2:
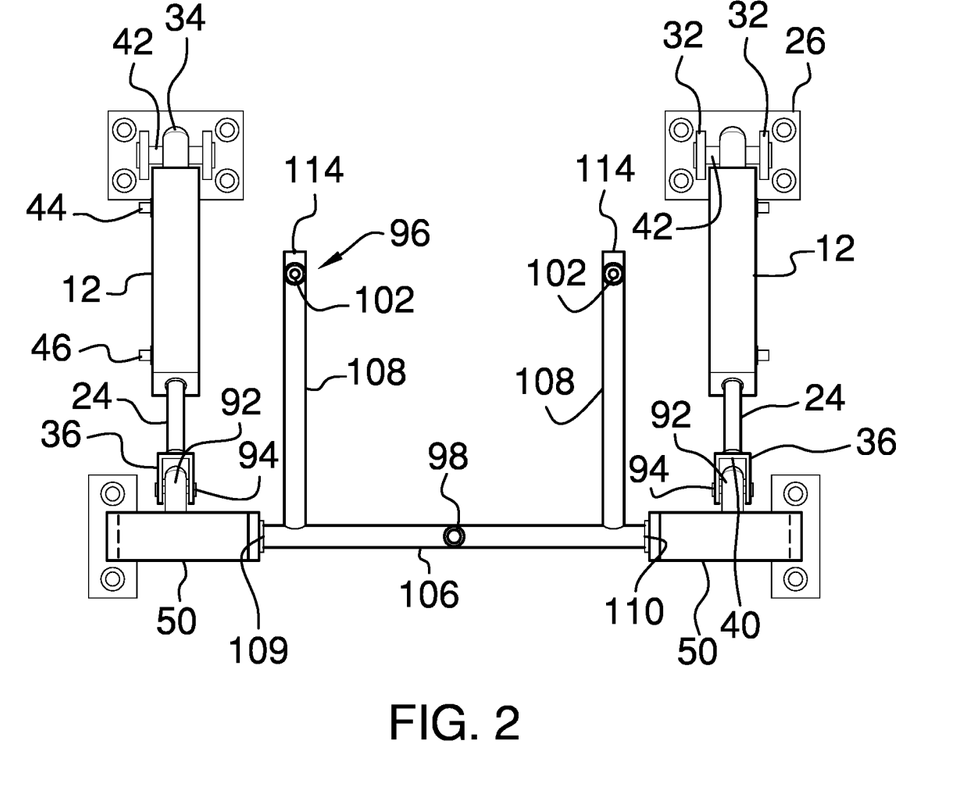
FIG. 2 is a back view of an embodiment of the disclosure.
Figure 3:
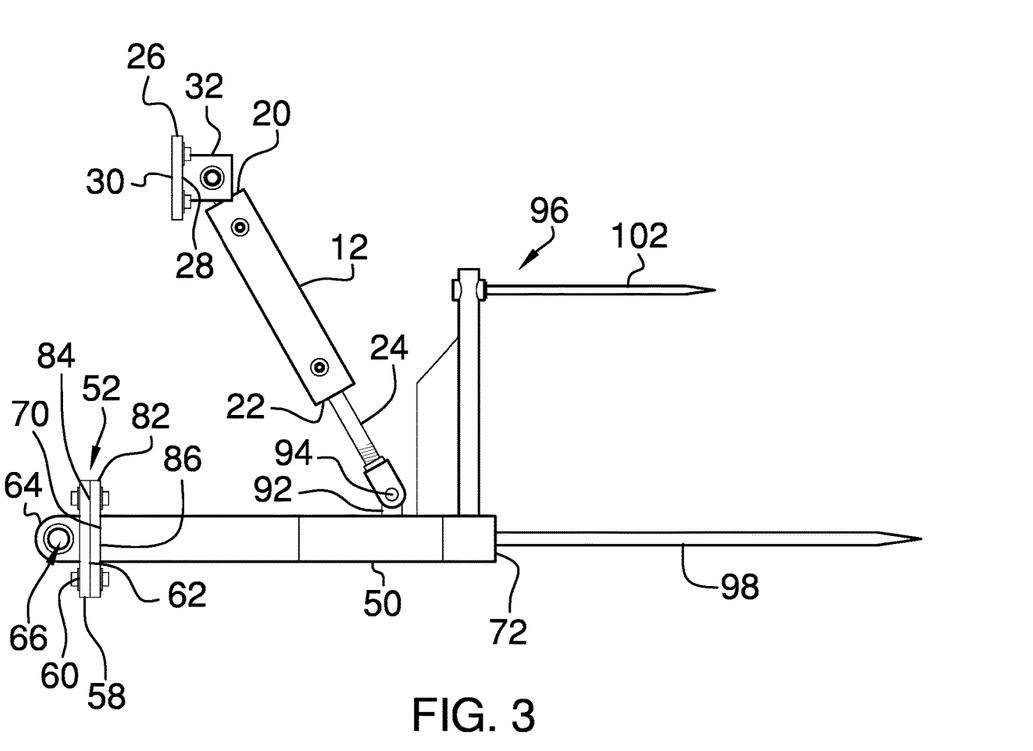
FIG. 3 is a left side view of an embodiment of the disclosure.
Figure 4:
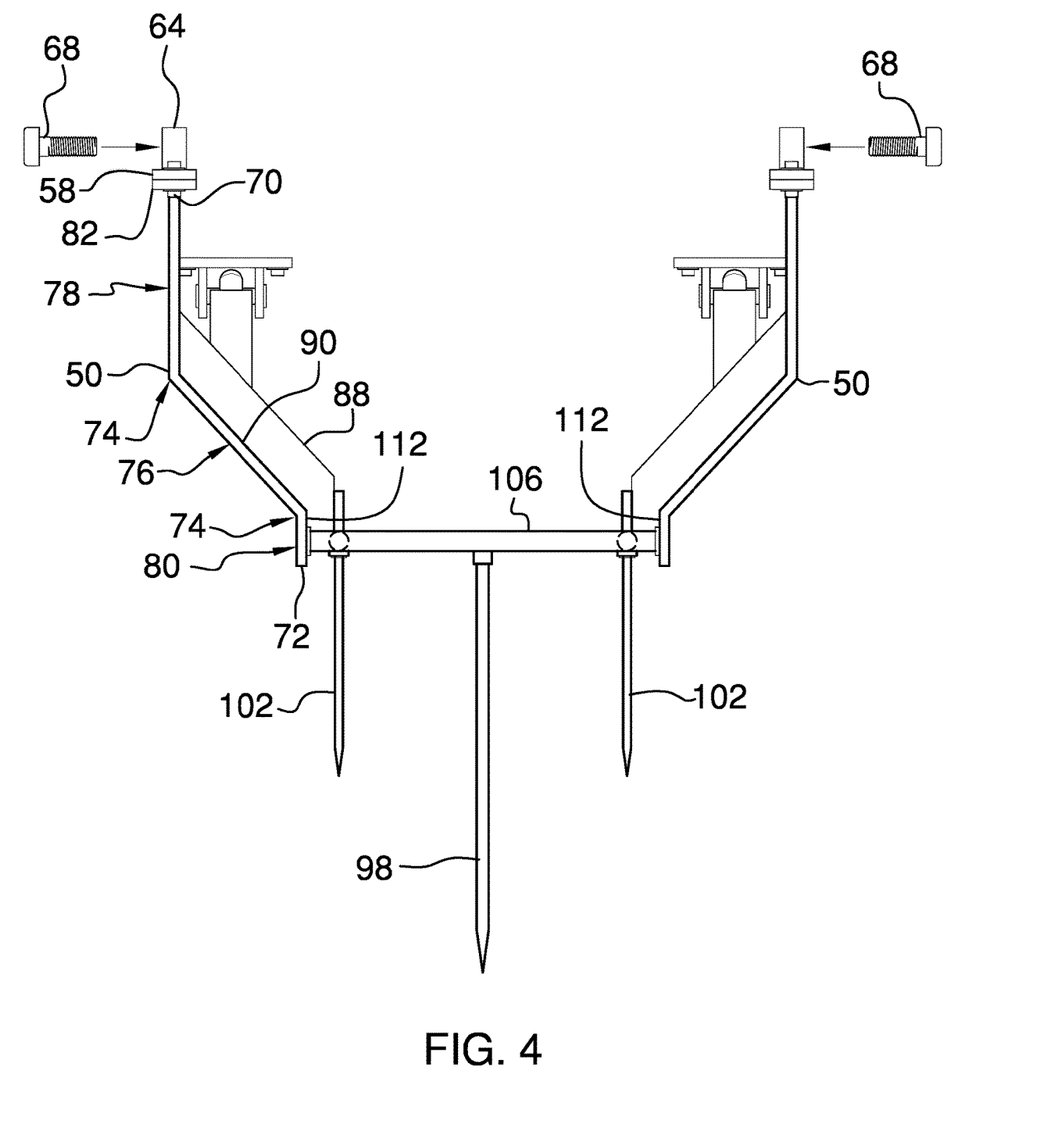
FIG. 4 is a bottom view of an embodiment of the disclosure.
Figure 5:
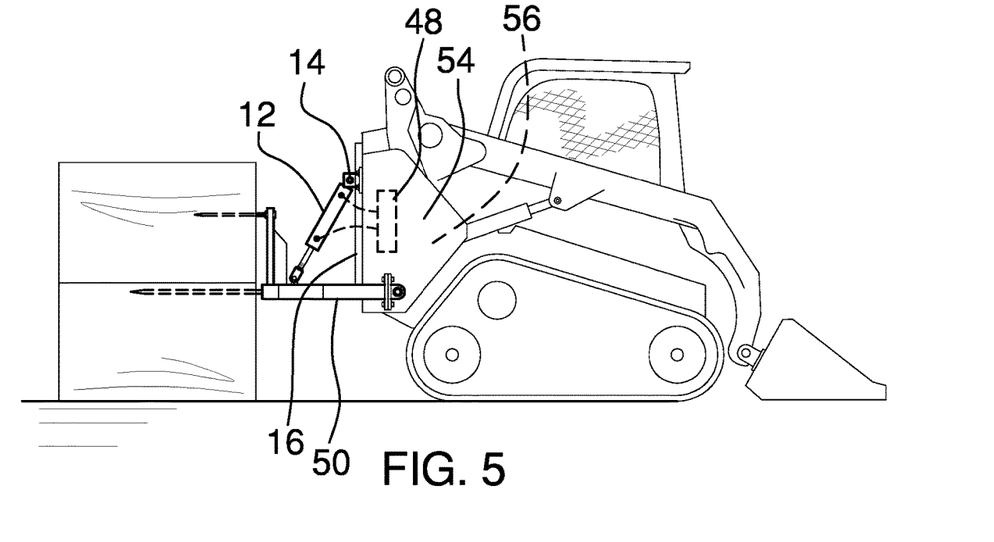
FIG. 5 is a perspective in-use view of an embodiment of the disclosure showing a pair of hay bales being penetrated by a first tine and a pair of second tines.
Figure 6:
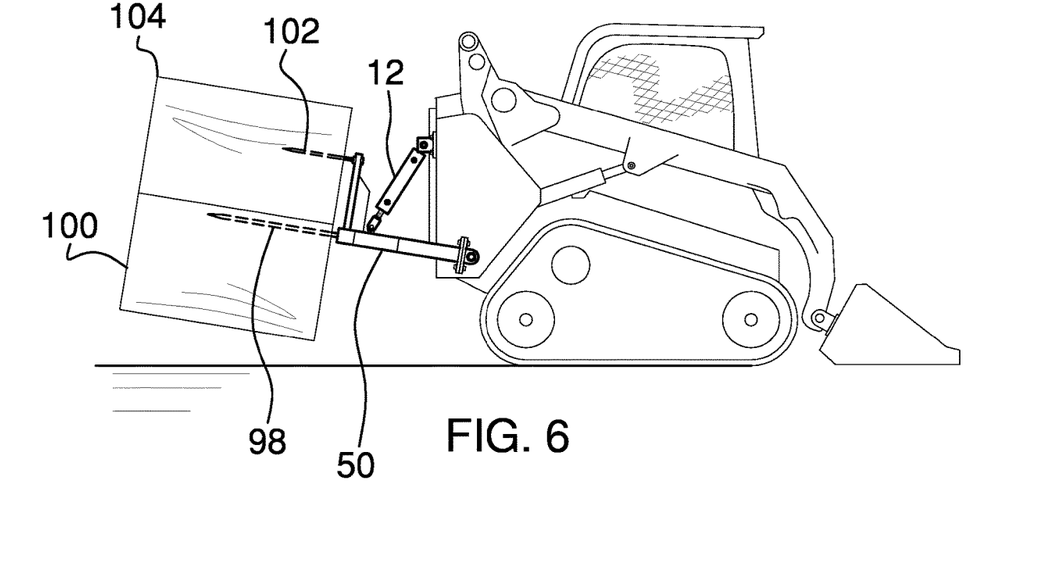
FIG. 6 is a perspective in-use view of an embodiment of the disclosure showing a first hay bale and a second hay bale being lifted and transported.

With reference now to the drawings, and in particular to FIGS. 1 through 6 thereof, a new hay bale fork device embodying the principles and concepts of an embodiment of the disclosure and generally designated by the reference numeral 10 will be described.

As best illustrated in FIGS. 1 through 6, the hay bale fork assembly 10 generally comprises a pair of hydraulic cylinders 12 that each has a connection point 14 being pivotally integrated onto the hydraulic cylinders 12. The connection point 14 on each of the hydraulic cylinders 12 is connected to a rear end 16 of a tractor 18. The tractor 18 may be a skid steer or other type of tractor that has a planar rear end. Each of the hydraulic cylinders 12 has a first end 20 and a second end 22, and each of the hydraulic cylinders 12 has a piston 24 that is movably integrated into the second end 22 of the hydraulic cylinders 12.

The connection point 14 on each of the hydraulic cylinders 12 comprises a mounting plate 26 that has a first surface 28 and a second surface 30. Additionally, the connection point 14 on each of the hydraulic cylinders 12 includes a pair of tabs 32 that is each coupled to and extends away from the first surface 28 of the mounting plate 26. Furthermore, the second surface 30 of the mounting plate 26 abuts the rear end 16 of the tractor 18, and the tabs 32 are spaced apart from each other. The first end 20 of each of the hydraulic cylinders 12 has a mounting cylinder 34 extending away from the first end 20. The mounting cylinder 34 on each of the hydraulic cylinders 12 is positioned between the pair of tabs 32 of a respective connection point 14. Moreover, the piston 24 associated with each of the hydraulic cylinders 12 has a yoke 36 that is disposed on a distal end 40 of the piston 24 with respect to the second end 22 of the hydraulic cylinder 12.

A pair of first mounting pins 42 is provided and each of the first mounting pins 42 extends through the pair of tabs 32 of a respective one of the connection points 14 and the mounting cylinder 34 on a respective one of the hydraulic cylinders 12. In this way the respective hydraulic cylinder 12 is pivotally coupled to the tabs 32 on the respective connection point 14. Each of the hydraulic cylinders 12 has in send port 44 and a return port 46, and each of the send port 44 and the return port 46 are fluidly coupled to a hydraulic system 48 of the tractor 18.

A pair of mounting brackets 50 is provided and each of the mounting brackets 50 has a connection point 52 that is integrated into the mounting brackets 50. The connection point 52 on each of the mounting brackets 50 is pivotally coupled to a respective first lateral side 54 and a second lateral side 56 of the tractor 18 having each of the mounting brackets 50 extending away from the rear end 16 of the tractor 18. Furthermore, each of the mounting brackets 50 is pivotally attached to a respective one of the hydraulic cylinders 12. Each of the mounting brackets 50 is urged between a lifted position and a lowered position when the hydraulic cylinders 12 are respectively retracted and extended.

The connection point 52 on each of the mounting brackets 50 includes a first plate 58 that has a primary surface 60 and a secondary surface 62. Additionally, the connection point 52 on each of the mounting brackets 50 includes a bearing 64 that is coupled to the primary surface 60 of the first plate 58. The bearing 64 has an opening 66 extending through the bearing 64 and the bearing 64 is oriented such that the bearing 64 has an axis of rotation which is oriented parallel to the primary surface 60. A pair of bolts 68 is provided and each of the bolts 68 is extendable through a respective one of the bearings 64 to engage a respective first lateral side 54 and second lateral side 56 of the tractor 18. In this way each of the bearings 64 is rotatably attached to the respective first lateral side 54 and second lateral side 56 of the tractor 18.

Each of the mounting brackets 50 has a coupled end 70 and a free end 72. Additionally, each of the mounting brackets 50 has a series of bends 74 that are distributed between the coupled end 70 and the free end 72 to define a medial portion 76 of the mounting brackets 50 angling between a first end portion 78 and a second end portion 80. The coupled end 70 is associated with the first end portion 78 and the free end 72 is associated with the second end portion 80. Each of the mounting brackets 50 includes a second plate 82 that has a primary surface 84 and a secondary surface 86. The second plate 82 is fastened to the first plate 58 having the primary surface 84 of the second plate 82 abutting the secondary surface 62 of the first plate 58.

The coupled end 70 of each of the mounting brackets 50 is coupled to the secondary surface 62 of the second plate 82 associated with a respective mounting bracket 50. Each of the mounting brackets 50 is oriented such that the medial portion 76 of each of the mounting brackets 50 angles toward each other. Thus, the coupled end 70 of each of the mounting brackets 50 is spaced apart from each other a distance that is greater than a distance between the free end 72 of each of the mounting brackets 50. The medial portion 76 of each of the mounting brackets 50 has a lip 88 extending away from a first side 90 of the medial portion 76. The first side 90 of the medial portion 76 of each of the mounting brackets 50 is directed toward each other.

A pair of mounting cylinders 92 is each coupled to and extends upwardly from the lip 88 on the medial portion 76 of a respective one of the mounting brackets 50. The yoke 36 on the distal end of the piston 24 of a respective one of the hydraulic cylinders 12 is positioned around a respective one of the mounting cylinders 92. A pair of second mounting pins 94 is provided and each of the second mounting pins 94 extends through the yoke 36 on the distal end 40 of the piston 24 of a respective one of the hydraulic cylinders 12 and a respective one of the mounting cylinders 92. In this way each of the hydraulic cylinders 12 is pivotally coupled to a respective one of the mounting brackets 50.

A lifting fork 96 is provided and the lifting fork 96 is coupled between each of the mounting brackets 50. The lifting fork 96 is lifted when the mounting brackets 50 are urged into the lifted position and the lifting fork 96 is lowered when the mounting brackets 50 are urged into the lowered position. The lifting fork 96 has a first tine 98 that is disposed on the lifting to penetrate a first hay bale 100. The lifting fork 96 has a pair of second tines 102 that is each disposed on the lifting fork 96 to penetrate a second hay bale 104. In this way the first hay bale 100 and the second hay bale 104 can be simultaneously transported on the tractor 18.

The lifting fork 96 comprises a first member 106 extending between a pair of second members 108. The first member 106 has a first end 109 and a second end 110, and each of second members 108 is positioned adjacent to a respective one of the first end 109 and the second end 110 of the first member 106. Each of the second members 108 is perpendicularly oriented with respect to the first member 106. Each of the first end 109 and the second end 110 of the first member 106 is coupled to a first side 112 of the second end portion 80 of a respective one of the mounting brackets 50 such that each of the second members 108 is vertically oriented. The first tine 98 is coupled to and extends away from the first member 106 at a point that is centrally located between the second members 108. Each of the second tines 102 is coupled to and extends away from a respective one of the second members 108 at a point that is located adjacent to a distal end 114 of the respective second member 108. The first tine 98 is perpendicularly oriented with the first member 106 and each of the second tines 102 is perpendicularly oriented with the second member 108.

In use, the connection point 14 on each of the hydraulic cylinders 12 is attached to the rear end 16 of the tractor 18 with bolts or other means of releasably attaching the connection point 14 on the hydraulic cylinder to the rear end 16. Additionally, each of the hydraulic cylinders 12 is fluidly coupled to the hydraulic system 48 of the tractor 18. The connection point 14 on each of the mounting brackets 50 is attached to the respective first lateral side 54 and second lateral side 56 of the tractor 18. The tractor 18 is driven rearwardly to facilitate the first tine 98 and each of the second tines 102 to penetrate the respective first hay bale 100 and second hay bale 104 which are stacked on top of each other. Each of the hydraulic cylinders 12 is actuated to lift each of the first hay bale 100 and the second hay bale 104 to simultaneously transport the first hay bale 100 and the second hay bale 104.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hay bale fork assembly for facilitating a pair of hay bales to be transported simultaneously on an implement, said assembly comprising:
   a pair of hydraulic cylinders, each of said hydraulic cylinders having a connection point being pivotally integrated onto said hydraulic cylinders wherein said connection point is configured to be connected to a rear end of a tractor;
   a pair of mounting brackets, each of said mounting brackets having a connection point being integrated into said mounting brackets wherein said connection point on each of said mounting brackets is configured to be pivotally coupled to a respective first lateral side and a second lateral side of the tractor having each of said mounting brackets extending away from the rear end of the tractor, each of said mounting brackets being pivotally attached to a respective one of said hydraulic cylinders, each of said mounting brackets being urged between a lifted position and a lowered position when said hydraulic cylinders are respectively retracted and extended;
   a lifting fork being coupled between each of said mounting brackets, said lifting fork being lifted when said mounting brackets is urged into said lifted position, said lifting fork being lowered when each of said mounting brackets is urged into said lowered position, said lifting fork having a first tine being disposed on said lifting fork wherein said first tine is configured to penetrate a first hay bale, said lifting fork having a pair of second tines each being disposed on said lifting fork wherein each of said second tines is configured to penetrate a second hay bale;
   wherein said connection point on each of said mounting brackets includes a first plate having a primary surface and a secondary surface;
   wherein said connection point on each of said mounting brackets includes a bearing being coupled to said primary surface of said first plate, said bearing having an opening extending through said bearing, said bearing being oriented such that said bearing has an axis of rotation being oriented parallel to said primary surface; and
   wherein said assembly includes a pair of bolts, each of said bolts being extendable through a respective one of said bearings wherein each of said bolts is configured to engage a respective first lateral side and second lateral side of the tractor for pivotally attaching said bearings to the respective first lateral side and second lateral side of the tractor.

2. The assembly according to claim 1, wherein each of said hydraulic cylinders has a first end and a second end, each of said hydraulic cylinders having a piston being movably integrated into said second end of said hydraulic cylinder, said connection point on each of said hydraulic cylinders comprising a mounting plate having a first surface and a second surface, said connection point on each of said hydraulic cylinders including a pair of tabs each being coupled to and extending away from said first surface of said mounting plate wherein said second surface of said mounting plate is configured to abut the rear end of the tractor, said tabs being spaced apart from each other.

3. The assembly according to claim 2, wherein said first end of each of said hydraulic cylinders has a mounting cylinder extending away from said first end, said mounting cylinder on each of said hydraulic cylinders being positioned between said pair of tabs of a respective connection point.

4. The assembly according to claim 3, further comprising a pair of first mounting pins, each of said first mounting pins extending through said pair of tabs of a respective one of said connection points and said mounting cylinder on a respective one of said hydraulic cylinders such that said respective hydraulic cylinder is pivotally coupled to said tabs on said respective connection point.

5. The assembly according to claim 1, wherein:
   each of said mounting brackets has a coupled end and a free end, each of said mounting brackets having a series of bends being distributed between said coupled end and said free end to define a medial portion of said mounting brackets angling between a first end portion and a second end portion, said coupled end being associated with said first end portion, said free end being associated with said second end portion;
   each of said mounting brackets includes a second plate having a primary surface and a secondary surface, said second plate being fastened to said first plate having said primary surface of said second plate abutting said secondary surface of said first plate; and
   said coupled end of each of said mounting brackets is coupled to said secondary surface of said second plate associated with a respective mounting bracket, each of said mounting brackets being oriented such that said medial portion of each of said mounting brackets angles toward each other such that said coupled end of each of said mounting brackets is spaced apart from each other a distance being greater than a distance between said free end of each of said mounting brackets.

6. The assembly according to claim 5, wherein said medial portion of each of said mounting brackets has a lip extending away from a first side of said medial portion, said first side of said medial portion of each of said mounting brackets being directed toward each other.

7. The assembly according to claim 6, wherein:
   each of said hydraulic cylinders has a first end and a second end, said piston associated with each of said hydraulic cylinders has a yoke being disposed on a distal end of said piston with respect to said second end of said hydraulic cylinder; and said assembly includes a pair of mounting cylinders, each of said mounting cylinders being coupled to and extending upwardly from said lip on said medial portion of a respective one of said mounting brackets, said yoke on said distal end of said piston of a respective one of said hydraulic cylinders being positioned around a respective one of said mounting cylinders.

8. The assembly according to claim 7, further comprising a pair of second mounting pins, each of said second mounting pins extending through said yoke on said distal end of said piston of a respective one of said hydraulic cylinders and a respective one of said mounting cylinders such that each of said hydraulic cylinders is pivotally coupled to a respective one of said mounting brackets.

9. The assembly according to claim 5, wherein said lifting fork comprises a first member extending between a pair of second members, said first member having a first end and a second end, each of second members being positioned adjacent to a respective one of said first end and said second end of said first member, each of said second members being perpendicularly oriented with respect to said first member, each of said first end and said second end of said first member being coupled to a first side of said second end portion of a respective one of said mounting brackets such that each of said second members is vertically oriented.

10. The assembly according to claim 9, wherein:
said first tine is coupled to and extends away from said first member at a point being centrally located between said second members;
each of said second tines is coupled to and extending away from a respective one of said second members at a point being located adjacent to a distal end of said respective second member;
said first tine is perpendicularly oriented with said first member; and
each of said second tines is perpendicularly oriented with said second member.

11. A bay bale fork assembly for facilitating a pair of hay bales to be transported simultaneously on an implement, said assembly comprising:
a pair of hydraulic cylinders, each of said hydraulic cylinders having a connection point being pivotally integrated onto said hydraulic cylinders wherein said connection point is configured to be connected to a rear end of a tractor, each of said hydraulic cylinders having a first end and a second end, each of said hydraulic cylinders having a piston being movably integrated into said second end of said hydraulic cylinder, said connection point on each of said hydraulic cylinders comprising a mounting plate having a first surface and a second surface, said connection point on each of said hydraulic cylinders including a pair of tabs each being coupled to and extending away from said first surface of said mounting plate wherein said second surface of said mounting plate is configured to abut the rear end of the tractor, said tabs being spaced apart from each other, said first end of each of said hydraulic cylinders having a mounting cylinder extending away from said first end, said mounting cylinder on each of said hydraulic cylinders being positioned between said pair of tabs of a respective connection point, said piston associated with each of said hydraulic cylinders having a yoke being disposed on a distal end of said piston with respect to said second end of said hydraulic cylinder;

a pair of first mounting pins, each of said first mounting pins extending through said pair of tabs of a respective one of said connection points and said mounting cylinder on a respective one of said hydraulic cylinders such that said respective hydraulic cylinder is pivotally coupled to said tabs on said respective connection point;

a pair of mounting brackets, each of said mounting brackets having a connection point being integrated into said mounting brackets wherein said connection point on each of said mounting brackets is configured to be pivotally coupled to a respective first lateral side and a second lateral side of the tractor having each of said mounting brackets extending away from the rear end of the tractor, each of said mounting brackets being pivotally attached to a respective one of said hydraulic cylinders, each of said mounting brackets being urged between a lifted position and a lowered position when said hydraulic cylinders are respectively retracted and extended, said connection point on each of said mounting brackets including a first plate having a primary surface and a secondary surface, said connection point on each of said mounting brackets including a bearing being coupled to said primary surface of said first plate, said bearing having an opening extending through said bearing, said bearing being oriented such that said bearing has an axis of rotation being oriented parallel to said primary surface, each of said mounting brackets having a coupled end and a free end, each of said mounting brackets having a series of bends being distributed between said coupled end and said free end to define a medial portion of said mounting brackets angling between a first end portion and a second end portion, said coupled end being associated with said first end portion, said free end being associated with said second end portion, each of said mounting brackets including a second plate having a primary surface and a secondary surface, said second plate being fastened to said first plate having said primary surface of said second plate abutting said secondary surface of said first plate, said coupled end of each of said mounting brackets being coupled to said secondary surface of said second plate associated with a respective mounting bracket, each of said mounting brackets being oriented such that said medial portion of each of said mounting brackets angles toward each other such that said coupled end of each of said mounting brackets is spaced apart from each other a distance being greater than a distance between said free end of each of said mounting brackets, said medial portion of each of said mounting brackets having a lip extending away from a first side of said medial portion, said first side of said medial portion of each of said mounting brackets being directed toward each other;

a pair of bolts, each of said bolts being extendable through a respective one of said bearings wherein each of said bolts is configured to engage a respective first lateral side and second lateral side of the tractor for pivotally attaching said bearings to the respective first lateral side and second lateral side of the tractor;

a pair of mounting cylinders, each of said mounting cylinders being coupled to and extending upwardly from said lip on said medial portion of a respective one of said mounting brackets, said yoke on said distal end of said piston of a respective one of said hydraulic cylinders being positioned around a respective one of said mounting cylinders;

a pair of second mounting pins, each of said second mounting pins extending through said yoke on said distal end of said piston of a respective one of said hydraulic cylinders and a respective one of said mounting cylinders such that each of said hydraulic cylinders is pivotally coupled to a respective one of said mounting brackets; and a lifting fork being coupled between each of said mounting brackets, said lifting fork being lifted when said mounting brackets is urged into said lifted position, said lifting fork being lowered when each of said mounting brackets is urged into said lowered position, said lifting fork having a first tine being disposed on said lifting fork wherein said first tine is configured to penetrate a first hay bale, said lifting fork having a pair of second tines each being disposed on said lifting fork wherein each of said second tines is configured to penetrate a second hay bale, said lifting fork comprising a first member extending between a pair of second members, said first member having a first end and a second end, each of second members being positioned adjacent to a respective one of said first end and said second end of said first member, each of said second members being perpendicularly oriented with respect to said first member, each of said first end and said second end of said first member being coupled to a first side of said second end portion of a respective one of said mounting brackets such that each of said second members is vertically oriented, said first tine being coupled to and extending away from said first member at a point being centrally located between said second members, each of said second tines being coupled to and extending away from a respective one of said second members at a point being located adjacent to a distal end of said respective second member, said first tine being perpendicularly oriented with said first member, each of said second tines being perpendicularly oriented with said second member.

* * * * *